(12) United States Patent  (10) Patent No.: US 6,892,502 B1
Hubbell et al. (45) Date of Patent: May 17, 2005

(54) SPACE FRAME SUPPORT STRUCTURE EMPLOYING WELD-FREE, SINGLE-CAST STRUCTURAL CONNECTORS FOR HIGHWAY SIGNS

(76) Inventors: David A. Hubbell, 112 Park Ave., Saranac Lake, NY (US) 12983; Robert W. Blyth, 6-3095 Arthur Hoole, St. Hubert, Quebec (CA) J3Y-8X2; Philip V. DeSantis, 6449 Bayberry Dr., Seven Hills, OH (US) 44131

( * ) Notice: Subject to any disclaimer, the term of this patent is extended or adjusted under 35 U.S.C. 154(b) by 0 days.

(21) Appl. No.: 10/397,842

(22) Filed: Mar. 27, 2003

Related U.S. Application Data

(60) Provisional application No. 60/457,290, filed on Mar. 26, 2003.

(51) Int. Cl.[7] .............................. E04B 1/18; E04C 3/02
(52) U.S. Cl. ...................... 52/633; 52/223.1; 52/223.8; 52/633; 52/690; 52/693; 52/694; 52/655.1; 52/653.2; 40/584; 40/606.1; 403/169; 403/170; 403/217; 403/237
(58) Field of Search ............................ 52/223.1, 223.8, 52/633, 690, 693, 694, 655.1, 653.2, 736.1, 52/736.2, 169.9, 712, 715; 40/584, 606.01, 40/612; 403/169, 217, 170, 175, 218, 237

(56) References Cited

U.S. PATENT DOCUMENTS

| | | |
|---|---|---|
| 7,134 A | 3/1850 | Clark |
| 33,454 A | 10/1861 | Pressey et al. |
| 83,196 A | 10/1868 | Montgomery |
| 114,039 A | 4/1871 | Pratt |
| 159,194 A | 1/1875 | Lowthorp |
| 176,000 A | 4/1876 | Johnson |
| 184,522 A | 11/1876 | Hammond |
| 184,968 A | 12/1876 | Johnson |
| 192,170 A | 6/1877 | Johnson |
| 361,097 A | 4/1887 | Stoffert et al. |
| 421,482 A | 2/1890 | Cottle |
| 468,186 A | 2/1892 | Beardsley |
| 548,165 A * | 10/1895 | Iavender ..................... 384/431 |
| 653,000 A | 7/1900 | Dundon |
| 735,920 A | 8/1903 | Visintini |
| 855,624 A | 6/1907 | Fetzer |
| 895,297 A | 8/1908 | Peter |
| 1,015,821 A | 1/1912 | Moore |

(Continued)

Primary Examiner—Jeanette Chapman
(74) Attorney, Agent, or Firm—Shlesinger, Arkwright & Garvey LLP

(57) ABSTRACT

A space frame support structure for highway signs comprises upper and lower chord members; a plurality of weld-free, single-cast connectors attached to and spaced along the respective length of the chord members; a plurality of diagonal members disposed between the upper and lower chord members in a series of "V"-shaped configuration connected end-to-end, each diagonal member forming a leg of a respective "V". Each leg including a bottom end portion and a top end portion. The bottom end portion is attached to a respective connector attached to the lower chord member. The top end portion is connected to another connector attached to the upper chord member. A plurality of pins are carried by each connector to secure each connector to the upper or lower chord member and to the respective bottom or top end portions of the diagonal members.

27 Claims, 4 Drawing Sheets

U.S. PATENT DOCUMENTS

| | | | |
|---|---|---|---|
| 1,092,503 A | 4/1914 | Moore | |
| 1,219,123 A * | 3/1917 | Macmechen et al. | 52/692 |
| 1,264,227 A | 4/1918 | Uhl | |
| 1,300,740 A | 4/1919 | Lachman | |
| 1,369,340 A | 2/1921 | Hutchinson | |
| 1,460,928 A | 7/1923 | Tilden | |
| 1,483,602 A * | 2/1924 | Bloss et al. | 403/175 |
| 1,500,235 A | 7/1924 | Clark | |
| 1,521,590 A | 1/1925 | Arnstein | |
| 1,523,106 A | 1/1925 | Dornier | |
| 1,537,589 A | 5/1925 | Dawson et al. | |
| 1,554,224 A | 9/1925 | McGrath | |
| RE16,482 E | 11/1926 | Lachman | |
| 1,638,634 A | 8/1927 | Lachman | |
| 1,651,032 A | 11/1927 | Macomber | |
| 1,694,514 A | 12/1928 | Naugle et al. | |
| 1,705,708 A | 3/1929 | Beisel | |
| 1,760,883 A * | 6/1930 | Moss | 403/217 |
| 1,760,955 A | 6/1930 | Moss | |
| 1,792,489 A * | 2/1931 | Gilmore | 403/175 |
| 1,808,692 A | 6/1931 | Sudduth | |
| 1,813,373 A | 7/1931 | Wooldridge | |
| 1,880,480 A | 10/1932 | Ragsdale | |
| 1,908,663 A | 5/1933 | Gentz | |
| 1,918,345 A | 7/1933 | McHose | |
| 1,924,881 A | 8/1933 | Ragsdale | |
| 2,007,898 A | 7/1935 | Ragsdale | |
| 2,053,226 A | 9/1936 | Ruge | |
| 2,156,818 A | 5/1939 | Ropp | |
| 2,189,201 A * | 2/1940 | Flader | 403/178 |
| 2,308,565 A | 1/1943 | Mitchell | |
| 2,316,560 A | 4/1943 | Causey | |
| 2,879,087 A | 3/1956 | Haglund | |
| 2,765,554 A | 10/1956 | Anderson et al. | |
| 2,931,467 A * | 4/1960 | Fentiman | 403/171 |
| 2,964,147 A | 12/1960 | Fentiman | |
| 3,334,867 A | 8/1967 | Wenaas | |
| 3,416,283 A | 12/1968 | Sanford | |
| 3,475,044 A * | 10/1969 | Konstant | 403/217 |
| 3,562,994 A | 2/1971 | Von Linsowe | |
| 3,564,783 A | 2/1971 | Dunne | |
| 3,570,204 A * | 3/1971 | Birkemier | 52/289 |
| 4,050,210 A * | 9/1977 | Gilb | 52/639 |
| 4,089,107 A * | 5/1978 | Sanford | 29/798 |
| 4,089,148 A * | 5/1978 | Oehmsen et al. | 52/693 |
| 4,129,975 A * | 12/1978 | Gabriel | 52/655.2 |
| 4,201,021 A * | 5/1980 | Aldag et al. | 52/93.1 |
| 4,325,648 A * | 4/1982 | De Bliquy et al. | 403/218 |
| 4,379,426 A * | 4/1983 | Thompson et al. | 100/100 |
| 4,543,008 A | 9/1985 | Salama et al. | |
| 4,551,957 A * | 11/1985 | Madray | 52/93.2 |
| 4,677,805 A | 7/1987 | Schleisner | |
| 4,829,739 A * | 5/1989 | Coppa | 52/745.2 |
| 4,890,429 A * | 1/1990 | Gatzka et al. | 52/640 |
| 4,964,749 A * | 10/1990 | Saari | 403/169 |
| 5,214,899 A * | 6/1993 | Beeche et al. | 52/648.1 |
| 5,224,320 A | 7/1993 | Mai | |
| 5,311,706 A | 5/1994 | Sallee | |
| 5,474,016 A | 12/1995 | Haney | |
| 5,526,614 A * | 6/1996 | Huang | 52/13 |
| 5,716,155 A | 2/1998 | Yoshida et al. | |
| 6,056,240 A * | 5/2000 | Hagenlocher | 244/125 |
| 6,065,267 A | 5/2000 | Fisher | |
| 6,205,739 B1 | 3/2001 | Newlin | |
| 6,227,752 B1 | 5/2001 | Friedrich | |
| 2002/0046534 A1 | 4/2002 | Heinly et al. | |

* cited by examiner

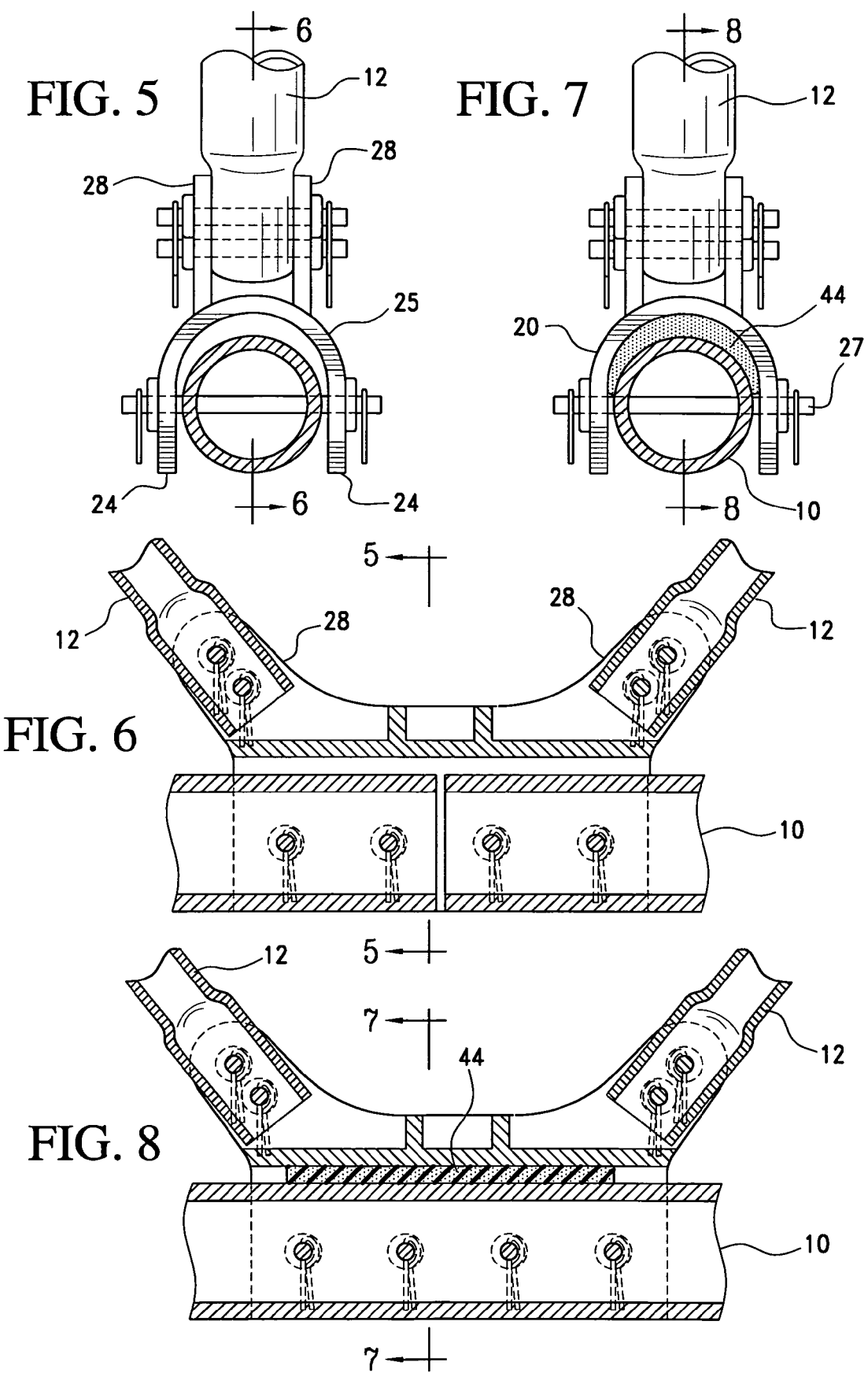

SPACE FRAME SUPPORT STRUCTURE EMPLOYING WELD-FREE, SINGLE-CAST STRUCTURAL CONNECTORS FOR HIGHWAY SIGNS

RELATED APPLICATION

This application claims the benefit of U.S. Provisional Application No. 60/457,290, filed on Mar. 26, 2003.

FIELD OF THE INVENTION

The present invention relates generally to a support structure for overhead signs commonly placed above the traveled lanes of a major highway, and particularly to a space frame support structure put together using weld-free, single-cast structural connectors.

BACKGROUND OF THE INVENTION

Support structures for overhead directional signs are commonly placed in overlying relation to vehicular travel lanes along major highways. These structures are subject to the wide and varying design and actual loading conditions typically encountered, such as wind loads, ice loads, live loads, and varying combinations of such. The failure of such an overhead structure, in which case it would likely fall into the pathway of speeding traffic, could be disastrous with consequent loss of life and injury to vehicular passengers. Thus, the dependability of overhead sign support structures used in this environment is critical.

Vehicular sign support structures are exposed to the havoc of outdoor corrosion that can be aggravated by the corrosive atmosphere prevailing in coastal and metropolitan regions. The weight of the driver information sign or sign supported is not necessarily insignificant. Moreover, such signs typically present large sail areas exposed to heavy and irregular wind loads eminently capable of inducing powerful vibrations in the support structure. Typically, such horizontal support structure is vulnerable to vibration as it extends long distances across multiple traffic lanes with corresponding vulnerability to rapidly changing dynamic loads induced by wind and vibration.

One of the causes of failures for these structures may be traced to metal fatigue. The nature of fatigue crack induced via weldment attachment imperfections is well known. In metallic truss structures for use as girders, frames or other purposes, parts are generally secured together by electrically welding them at the points of intersection. Due to the softening of the metal and the application of pressure in the welding operation, the edges of the metal components being welded together bite or sink into each other slightly at these points of welded contact. The resulting metallurgic and physical discontinuities resulting from the welding process has been identified as one of the significant causes of fatigue load susceptibility.

Due to the fact that a welded, riveted or other type joint, under tension, is dependent wholly upon the amount of material used at the joint (either welded or riveted), such joint as compared to a similar joint for compression members is weak, inefficient, and incapable of long withstanding distresses carried thereto.

OBJECTS AND SUMMARY OF THE INVENTION

It is an object of the present invention to provide a space frame support structure for traffic signs of simple and relatively inexpensive weld-free construction, which may be erected in a variety of configurations and sizes, and which may be readily assembled and disassembled.

It is another object of present invention to provide a structural, single-cast, weld-free connector for assembly of a space frame support structure for ready connection to chord and diagonal members and thereby permit erection of the structure at a wide range of configurations.

It is still another object of present invention to provide a structural, single-cast, weld-free connector for assembly of a space frame support structure that obviates the fatigue problems associated with welded structures.

In summary, the present invention provides a space frame support structure for highway signs, comprising upper and lower chord members, diagonal members connected to the chord members, and weld-free single-cast connectors for connecting the diagonal members to the chord members. The structure may provide a camber to offset dead loads.

The connectors are used to connect chord members together in end-to-end relation to produce a span long enough to cross the traveled lanes of the highway. The connectors are placed saddle-like over the chord members forming a yoke. The connectors have registering openings in the yoke's legs which act as guides for formation of matching holes in the chord members.

The connectors are structural single-cast pieces with through bolt attachment to tubular members through the neutral axis (generally, geometric center) of the tubular element.

The connector for connecting planar truss or space frame chord member to one or more diagonal members to in the aforementioned truss or space frame, comprises a single piece, single-cast weld-free structural body including a base wall and opposed first and second walls extending from the base wall, defining a saddle for receiving the chord member; and third and fourth opposed walls extending from the base wall in a direction away from the first and second walls. The first, second, third and fourth walls provide sufficient dimensionality for the formation of holes aligned through respective openings in the chord member and diagonal member for receiving pins for securing the members to the connector. When required by design constraints, a structural pad may be disposed on contact surface or surfaces of the base wall and/or first wall and/or second wall and/or third wall and/or fourth wall.

These and other objects of the present invention will become apparent from the following detailed description.

BRIEF DESCRIPTIONS OF THE DRAWINGS

FIG. 5 is a cross-sectional view taken along line 5—5 of FIG. 6.

FIG. 6 is a cross-sectional view taken along line 6—6 of FIG. 5.

FIG. 7 is a cross-sectional view taken along line 7—7 of FIG. 8.

FIG. 8 is a cross-sectional view taken along line 8—8 of FIG. 7.

DETAILED DESCRIPTION OF THE INVENTION

Figure 1:
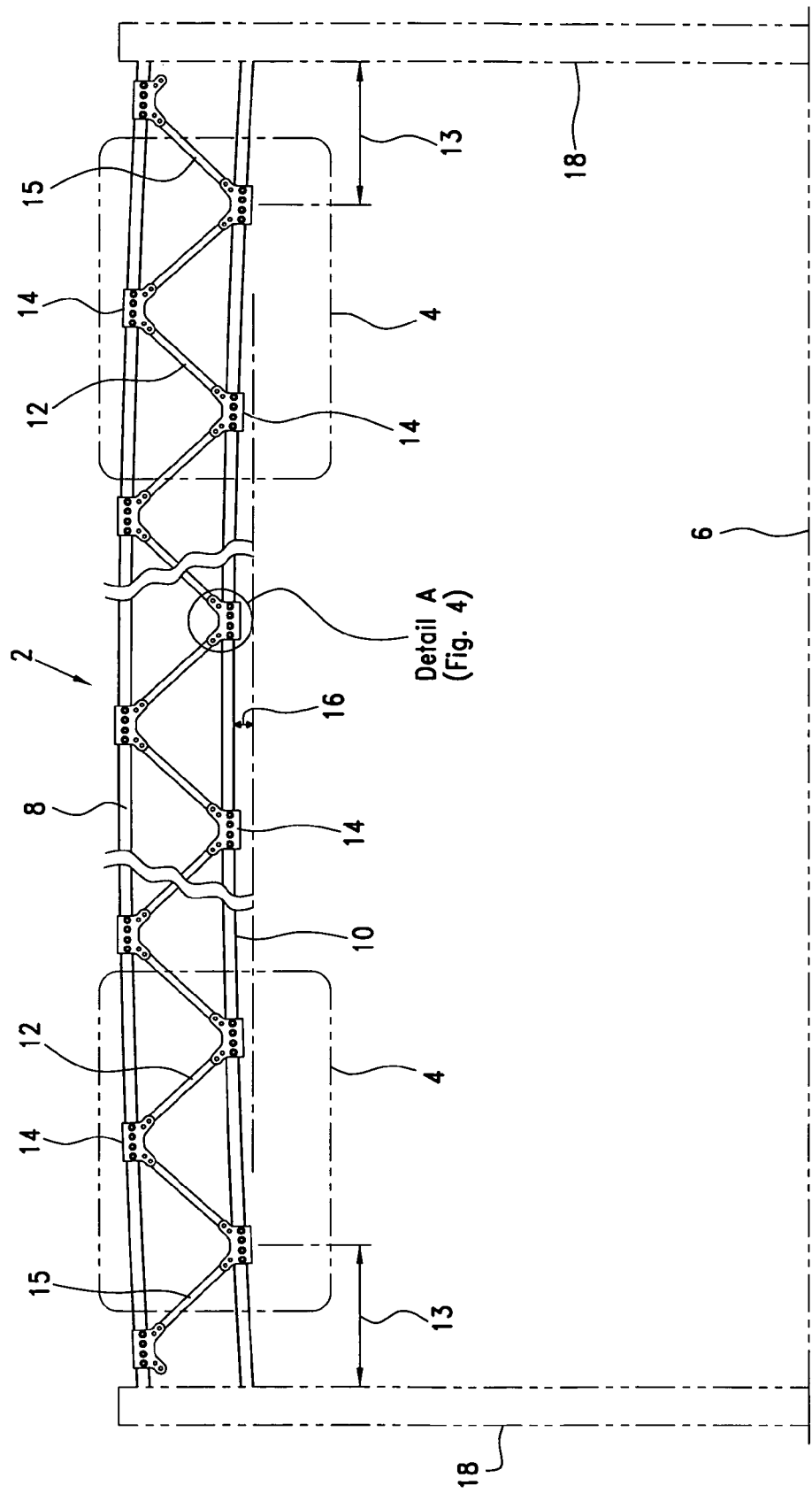
FIG. 1 is planar truss space frame structure, made in accordance with the present invention, for supporting highway signs or other fixtures above the travel lanes of a major highway.

A space frame support structure 2, made in accordance with the present invention, for supporting highway signs 4 over a highway travel lanes 6 is disclosed in FIG. 1. The structure 2 may be a planar truss or a space frame, but for illustration purposes, it is shown as a planar truss, with the understanding that the structure can be made into different configurations and sizes. The structure 2 comprises an upper chord member 8 and a lower chord member 10 joined by diagonal members 12 by means of weld-free, single-cast connectors 14, as will be discussed further below. The diagonal members form a series of "V"-shaped configuration connected end-to-end. The structure 2 has a camber 16 for both the upper chord member 8 and the lower chord member 10 to advantageously offset the design dead loads, such as the weight of the structure itself and the highway signs 4. The structure 2 is supported at both ends by uprights 18, which are conventional in the industry.

Figure 2:
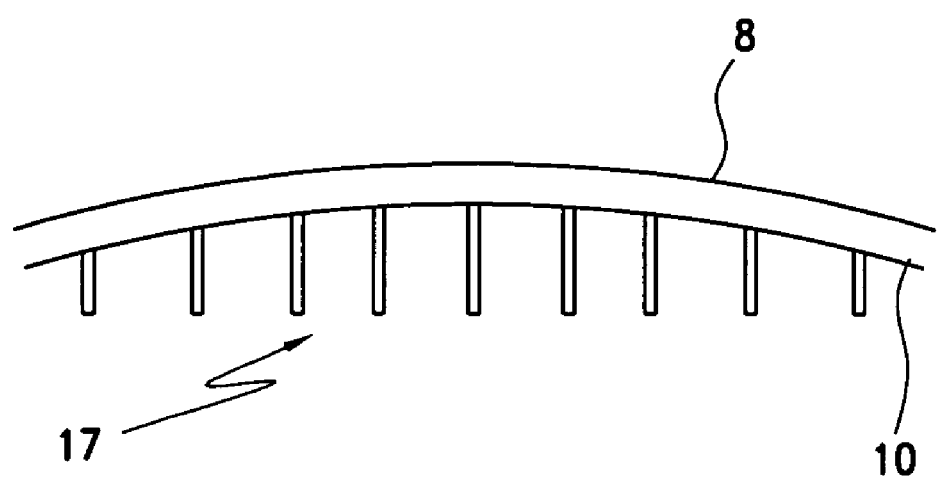
FIG. 2 is a schematic view of a false work for forming a camber in the shape of the structure of FIG. 1.

To make the camber 16, the chord members 8 and 10 are supported over a false work 17 having the desired camber, as shown schematically in FIG. 2. The diagonal members 12 are arranged in the desired geometry before attachment of the connectors 14. Since the holes through the chord and diagonal member are formed while the members are arranged to provide the camber, the present invention thus overcomes the prior art's inability to set camber into the space frame during fabrication.

The chord and diagonal members are preferably round metal pipes, such as aluminum pipes.

The engineering properties of chord members 12 in a "simple"-supported highway sign support space frame consisting of "pin-connection" structural joints are usually dictated by the chord members' end-of-span condition of "unsupported-length", identified as the distance 13, from the last diagonal 15 to the end-frame "saddle" which defines the space frame's structural attachment to the uprights 18. A "saddle" is a simple connection comprising, for example, a U-bolt holding down the end portion of the chord member to a horizontal surfaced member of the upright.

Figure 3:
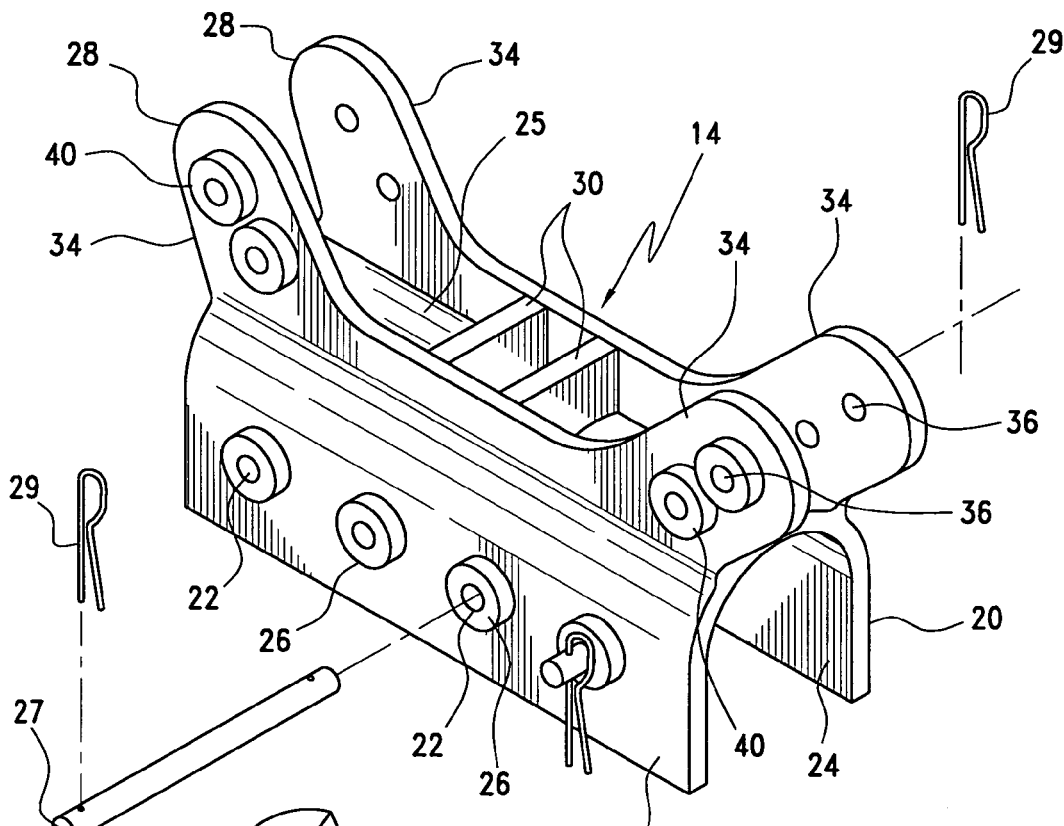
FIG. 3 is a perspective view of a weld-free, single-cast, structural connector used in constructing the structure of FIG. 1.
Figure 4:
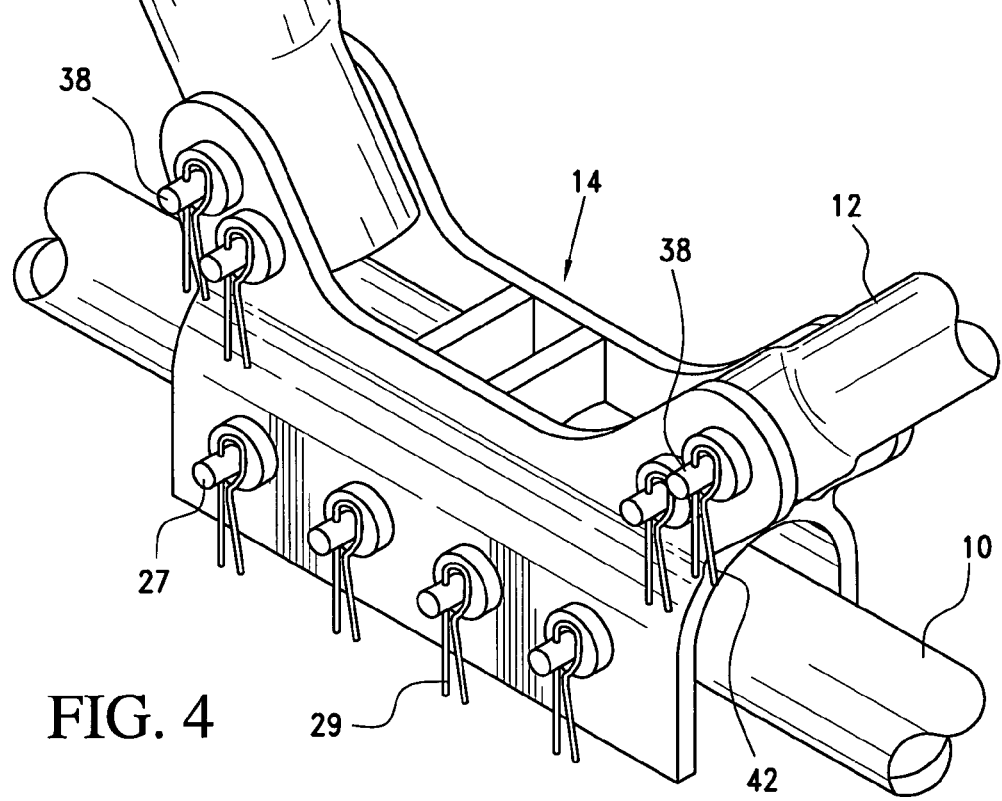
FIG. 4 is an enlarged perspective of detail A taken from FIG. 1.

Each structural connector 14 is weld-free, cast in one piece, preferably made of metal such as aluminum. Referring to FIGS. 3 and 4, the connector 14 includes a U-shaped longitudinal body 20 adapted to receive within its interior "saddle-style" the upper chord member 8 or the lower chord member 10. A series of holes 22 are disposed along each opposing wall 24 of the body 20. The holes 22 are disposed to line up with corresponding holes made diametrically through the chord member, as best shown in FIGS. 5 and 7. The areas around each hole 22 is preferably raised above the side surface of the walls 24, preferably in the form of wheel-shaped bosses 26. The holes 22 act as guides for the formation of the matching holes in the respective chord member. The walls 24 are preferably parallel to each other. The holes 22 are adapted to receive respective pins 27 which are used to secure the chord members to the connector 14.

Cotter pins 29 are received in respective end holes in the pins 27 to secure the pins in place.

The connector 14 includes opposed side walls 28 joined to the base wall 25 of the body 20 and reinforced by a pair of cross members 30. Each wall 28 is substantially U-shaped in side view, with a base portion 32 and leg portions 34. The leg portions 34 are appropriately angled along the direction of the respective diagonal members to which they are attached. Each leg portion 34 has holes 36 adapted to receive respective pins 38 that are used to secure the diagonal members 12 to the connector 14. The area around each hole is raised above the outside surface of the leg portion 34 preferably in the form of wheel-shaped bosses 40, similar to the bosses 26. Cotter pins 42 are used to secure the respective pins 38 in place, as best shown in FIG. 3.

The shape of the connector 14 advantageously provides a casting that allows for simple-release by virtue of one side remaining convex to at least one plane of reference and without cavities hidden to the plane of reference.

The pins 27 and 38 could be in the form of bolts, rods, or other similar hardware to provide structural connection between the connector 14 and the chord members 10 or the diagonal member 12.

Referring to FIG. 5, the walls 24 extend from the base wall 25 and are parallel to each other. The walls 28 are similarly parallel to each other. The extended walls 24 advantageously provide seating to the chord member and increased moment-resistance for the structure's unsupported length 13, providing buckling resistance to the chord, in the out-of-plane to the attached diagonals, beyond the chord member's neutral axis.

The end portions of the diagonal members 12 are preferably formed into an oval to provide flat transfer end flanges.

Referring to FIG. 6, the walls 28 are shown angled in the direction of the respective diagonal members 12. The chord member 10 is shown in two sections, advantageously joined end-to-end, by the connector 14. This feature of the invention solves the problem of transporting the chord members in sections that would fit in most tractor trailer transports. Most highway sign support space frame structures span lengths that exceed the economically allowable maximum over-the-highway tractor-trailer length. As such, the typical highway sign support space frame is designed in two or more sections which are then assembled into its final configuration at or near the structure's intended site use.

Referring to FIGS. 7 and 8, a structural pad 44 is disposed within the body 20 between the base wall 25 and the chord member. The pad 44 advantageously provides positive bearing across the top of the chord member while pre-stressing the pins 27 and the body 20. The use of the pad 44 also helps to dampen the cyclic, fatigue inducing loadings to which the structure 2 may be subjected.

Although not shown, the structural pad 44 may also be used between the diagonal member end portion and the wall portions 34 of the connector 14 to advantageously provide damping and/or pre-stressing of attachment hardware.

The structure 2 is able to reduce the chord member cross-section through placement of the holes 22 in a pattern nominally along the space frame's chords' neutral-axis in dead-load induced moment. The neutral axis is generally the geometric center of the chord member under conditions of dead load normally encountered in the environment of the invention. The placement of the holes 22 successively in the line of strain does not reduce the load carrying capacity of the structure because it is the chord's unsupported length 13 of the structural element section bridging the structure 2 to the end-frame 18 that dictates the chord's structural requirements. The sizing of the tubes in a tube frame is determined, at least in part, by the cross sectional area moment of inertia. In other words, a tube size is conventionally chosen to prevent the tubes from buckling and thereby keeping from collapsing, for axially loaded tubular members of a "pin-connected" space frame. However, the unsupported length 13 of a chord member's moment-resistant span from the structure's last panel-point to the structure's end-frame support 18 dictates the chord's engineering properties' requirements. This relatively short unsupported-length of span, relative to the typical, overall, geometry of the standard highway sign support space frame structure, results in over-designed chord section engineering properties.

Traditional engineering analysis of typically encountered tubular space frame designs for use as highway sign support structures identifies the compressive state, and not the tensile state, of the diagonals 12 as a key structural capacity limitation of the space frame. Recently adopted AASHTO Design Code changes, specially, "AASHTO Standard Specifications for Structural Supports for Highway Signs, Luminaires and Traffic Signals, $4^{th}$ Edition, 2001, Section 11, Fatigue Design", and expanded on by Report 469, 2002 of the U.S. Transportation Research Board's (TRB) National Cooperative Highway Research Program (NCHRP) entitled "Fatigue-Resistant Design of Cantilevered Signal, Sign, and Light Supports", identifies diagonal tensile state of weldment construction, when subjected to cyclic loadings, relative to Design Code induced structural limitation requirements on diagonal compressive state, as a significantly greater space frame structural capacity limitation. Accordingly, the connector 14 is designed to handle the compressive forces from the diagonal members 12.

The connector 14 advantageously provides a robust structural attachment without the standard practice of attachment directly to chord members and thereby potentially inducing moment in an otherwise axially loaded only structural element of the space frame. The connector 14 also provides a structurally robust fixture for the space frame end of the chords' "unsupported-length", moment-carrying structural element which attaches to the overall structural system's end frames. The connector 14 advantageously provides significant increase in section-modulus to the chords' unsupported-length's free-span compared to the traditional coped and welded chord to the last diagonal joint design, in addition to foreshortening the actual unsupported-length, owing to the length of body 20.

While this invention has been described as having preferred design, it is understood that it is capable of further modification, uses and/or adaptations following in general the principle of the invention and including such departures from the present disclosure as come within known or customary practice in the art to which the invention pertains, and as may be applied to the essential features set forth, and fall within the scope of the invention or the limits of the appended claims.

We claim:

1. A space frame support structure for highway signs, comprising:
   a) upper and lower chord members;
   b) a plurality of weld-free, made from a single cast connectors attached to and spaced along the respective length of said upper and lower chord members;
   c) a plurality of diagonal members disposed between said upper and lower chord members in a series of "V"-shaped configuration connected end-to-end, each diagonal member forming a leg of a respective "V";
   d) each leg including a bottom end portion and a top end portion, said bottom end portion being attached to a respective connector attached to said lower chord member, said top end portion being connected to another connector attached to said upper chord member; and
   e) a plurality of pins carried by each connector, said pins to secure each connector to said upper or lower chord member and to respective bottom or top end portions of said diagonal members;
   f) each of said weld-free, made from single cast connectors including a "u"-shaped saddle portion configured to receive said upper and lower chord member;
   g) each of said weld free, made from single cast connectors including a pair of opposed walls secured to a bottom portion of said saddle portion; and
   h) said respective bottom or top end portions of said diagonal members are secured between said opposed walls.

2. A space frame support structure as in claim 1, wherein said chord and diagonal members are circular pipes.

3. A space frame support structure as in claim 2, wherein said pipes are aluminum.

4. A space frame support structure as in claim 1, wherein said upper and lower chord members are bowed upwardly to provide a camber.

5. A space frame support structure as in claim 1, wherein said bottom and top end portions are flattened to form an oval shape.

6. A space frame support structure as in claim 1, wherein said opposed walls are "U"-shaped.

7. A space frame support structure as in claim 1, and further comprising cross-members between said opposed walls.

8. A space frame support structure as in claim 1, wherein:
   a) said saddle portion includes a pair of opposed side walls having a plurality of holes aligned across said opposed side walls; and
   b) said pins are received through respective aligned holes through corresponding holes in said upper or lower chord member.

9. A space frame support structure as in claim 8, wherein said corresponding holes are diametrically disposed through said upper or lower chord member.

10. A space frame support structure as in claim 8, wherein said saddle portion opposed side walls include raised areas around said holes, said raised areas extending above an outside surface of each opposed side wall.

11. A space frame support structure as in claim 1, and further comprising a structural pad disposed between said saddle portion and said upper or lower chord member within said saddle portion.

12. A space frame support structure as in claim 1, wherein:
   a) said pair of opposed side walls include a plurality of aligned holes through said opposed side walls; and
   b) said pins are received through respective aligned holes through corresponding holes in said top or bottom end portions of said diagonal members.

13. A space frame support structure as in claim 1, wherein said pins include cotter pins at their respective ends.

14. A space frame support structure as in claim 1, wherein said pair of opposed walls include raised areas around said holes, said raised areas extending above an outside surface of each opposed side walls.

15. A space frame support structure as in claim 1, wherein:
   a) said upper or lower chord member is in two sections; and b) said two sections are butt joined end-to-end within said saddle portion.

16. A structural connector for connecting a space frame chord member to one or more diagonal members, comprising:
   a) a single piece, made from a single cast weld-free structural body including a base wall and opposed first and second walls extending from the base wall, defining a saddle for receiving the chord member;
   b) third and fourth opposed walls extending from the base wall in a direction away from said first and second walls, said third and fourth walls defining a space therebetween for receiving one or more end portions of the diagonal members; and
   c) a plurality of pins carried by said connector, said pins to secure said connector to the chord member and to the one or more end portions of the diagonal members.

17. A connector as in claim 16, wherein said first and second walls are parallel to each other.

18. A connector as in claim 16, wherein said first and second walls include a plurality of aligned holes across said saddle.

19. A connector as in claim 18, wherein said first and second walls include raised areas around said holes extending above an outside surface of each wall.

20. A connector as in claim 16, wherein third and fourth walls are parallel to each other.

21. A connector as in claim 16, wherein said third and fourth walls include a plurality of aligned holes across said third and fourth walls.

22. A connector as in claim 21, wherein said third and fourth walls include raised areas around said holes extending above an outside surface of each wall.

23. A connector as in claim 21, wherein said third and fourth walls are "U"-shaped including leg portions.

24. A connector as in claim 23, wherein said holes are disposed in said leg portions.

25. A connector as in claim 23, wherein said leg portions are angled in the direction of the respective diagonal member.

26. A connector as in claim 16, and further comprising cross members disposed between said third and fourth walls.

27. A connector as in claim 16, wherein said body is aluminum.

* * * * *